United States Patent [19]

Heckethorn

[11] 4,365,392
[45] Dec. 28, 1982

[54] GAS-TIGHT EXHAUST CLAMP FOR TUBING SLIP-JOINTS

[75] Inventor: John E. Heckethorn, Dyersburg, Tenn.

[73] Assignee: Heckethorn Manufacturing Company, Dyersburg, Tenn.

[21] Appl. No.: 960,036

[22] Filed: Nov. 13, 1978

[51] Int. Cl.³ .................. A44B 21/00; F16L 25/00
[52] U.S. Cl. .......................... 24/256; 24/276; 285/420
[58] Field of Search ............. 24/256, 276, 275, 277, 24/278, 279; 285/382.2, 420, 253

[56] References Cited

U.S. PATENT DOCUMENTS

| | | | |
|---|---|---|---|
| 381,426 | 4/1888 | Sargent | 24/276 |
| 1,481,674 | 1/1924 | Barnes | 24/276 |
| 2,093,210 | 9/1937 | Powell | 24/276 |
| 2,330,898 | 10/1943 | King | 24/279 |
| 2,719,345 | 10/1955 | Riker | 285/420 |
| 2,821,768 | 2/1958 | Beckham et al. | 285/420 |
| 2,908,061 | 10/1959 | Adams | 285/420 |
| 3,109,215 | 11/1963 | Brown | 24/276 |
| 3,633,254 | 1/1972 | Hoglund | 24/276 |
| 3,955,250 | 5/1976 | Heckethorn | 24/278 |

FOREIGN PATENT DOCUMENTS

| | | | |
|---|---|---|---|
| 174545 | 3/1961 | Sweden | 24/276 |
| 281238 | 1/1929 | United Kingdom . | |
| 544491 | 4/1942 | United Kingdom . | |
| 588126 | 5/1947 | United Kingdom . | |
| 599102 | 3/1948 | United Kingdom . | |
| 745888 | 3/1956 | United Kingdom . | |
| 1528935 | 10/1978 | United Kingdom . | |

Primary Examiner—Victor N. Sakran
Attorney, Agent, or Firm—Dennison, Dennison, Meserole & Pollack

[57] ABSTRACT

A ring clamp capable of forming a gas-tight 360° indentation in a tubing slip-joint, the structure comprises a circular cross-section which is discontinuous over a minor portion of its circumference and has a threaded bolt leg extending from a first end thereof. A tightening lug member comprised of a cylindrical tubular housing and having a planar web extending from one side thereof fits within the discontinuity in the ring, the bolt leg extending freely into the tubular housing and the other end of the ring being welded to the planar web. An inner edge of the web is arcuately formed to continue the circular arc of the ring within the discontinuity, the arcuate surface thus formed being continued by arcuately edged flared portions of the tubular housing located at the entry end of said housing where the bolt leg extends into said housing. The inner perimetric surface of the ring at said entry end lies effectively at the same point on the inner circular arc defined by the ring clamp as the innermost distal corner edge portions of the flared portions, the bolt leg being supported against outward radial movement at this locus within the tubular housing. A nut fitting on the threaded end of the bolt leg and torqued against the exit end of the housing reduces the inner circumference of the ring clamp to impress a bead in a tubing slip-joint over which the ring clamp has been fitted, the bead being formed by the pressure of the ring, the inner arcuate surfaces of the web, and the flared portions of the tubular housing, thereby to form the gas-tight joint and to secure the tubing portions together.

8 Claims, 9 Drawing Figures

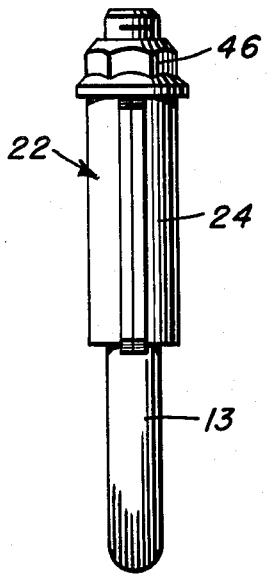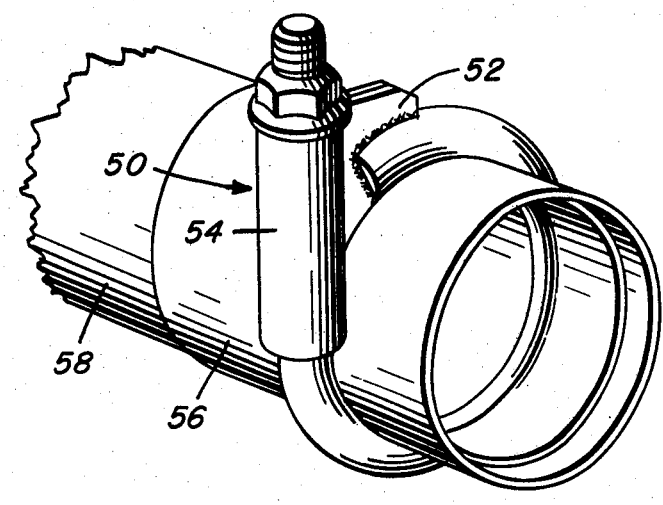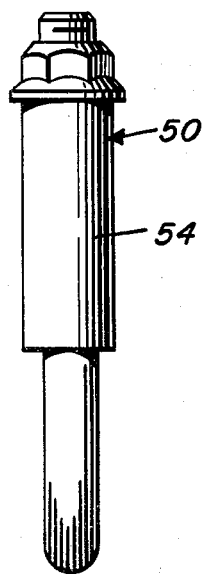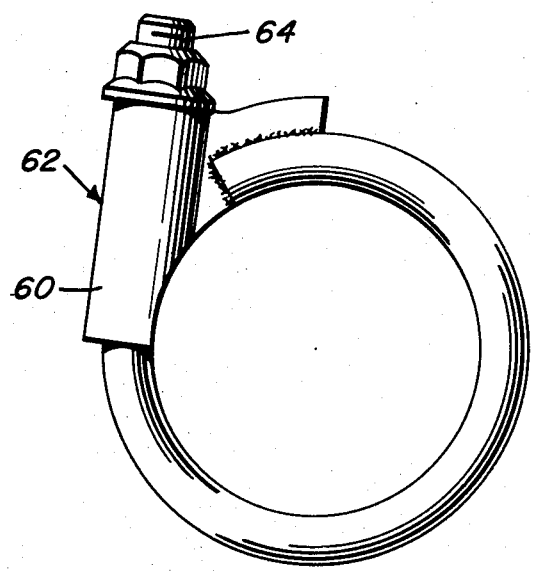

GAS-TIGHT EXHAUST CLAMP FOR TUBING SLIP-JOINTS

BACKGROUND OF THE INVENTION

1. Field of the Invention

The present invention generally relates to clamp structures capable of securing concentric tubular members together at or near a slip-joint and additionally capable of forming a low-leakage connection between such tubular members. In particular, the invention relates to a ring clamp capable of forming an essentially gas-tight 360° indentation in such a tubing slip-joint and acting to secure the joint.

2. Description of the Prior Art

Clamping structures capable of securing concentric tubing together at a slip-joint are well known, one well known exemplary structure taking the form of a U-shaped bolt member with a saddle member respectively receiving the legs of the bolt member within spaced tubular receptacles on said saddle member. The saddle member has an arcuate inwardly disposed edge surface, the contours of which complete a 360° arc in concert with an arcuate back portion of the U-shaped bolt. A circular perimetric surface thus formed is capable of impressing a 360° bead into concentric tubing to form a substantially gas-tight seal, the clamp further securing the tubing together. One particularly useful clamp which exhibits such capability is the structure disclosed in U.S. Pat. No. 3,955,250 by Heckethorn, this structure being particularly suited to heavy duty applications, that is, for applications where torque levels applied to the clamp must typically range from 40 and 80 foot-pounds in order to meet critical sealing requirements associated with anti-pollution devices installed in presently available motor vehicles. Many slip-joints on exhaust piping need not be secured with so great a torque but still demand substantially leak-free performance. Such clamps must also be low in cost, of a small size and light weight, and be easily installable. Clamps presently in use for such applications exhibit certain of these characteristics but no such clamp which has been heretofore known has provided all of these characteristics and has further been capable of eliminating gas-leakage at the slip-joint.

Brown, in U.S. Pat. No. 3,109,215 discloses a ring clamp which is tensioned about a slip-joint by only a single nut cooperating with a threaded leg portion which extends from one end of a discontinuous ring member. The ring member of Brown has a first end which includes an end face generally tangential to the inner circumference of a main circular portion of the clamp. The Brown structure is further seen to have side portions which are formed with generally circular upper edges of "slightly greater radii" than that of the inner circumference of the ring member, and located so that only the ring member itself is adapted to engage the telescoping tubing being secured and sealed. As will be seen from the following, the present invention provides a ring-like clamping structure tensionable by a single nut and comprising a main ring portion having an end face which is not tangential to the inner circumference of the ring portion. Further, in the clamping structure of the present invention, the inner circumference of the main ring portion and the inner circumference of an associated lug member fitting within a discontinuity in the ring portion are identical, both the ring portion and the lug member contacting the tubing which is to be secured and sealed. The structural differences taught by the present invention occasion a substantial difference in sealing capability, the present structure exhibiting virtually 0-leakage at 20 foot-pounds nut torque at pressures of 15 psi. Similar clamps which are available and including those clamps which are now standard equipment on presently available motor vehicles have leakages in excess of 18,000 SCCM under the same test conditions. Such dramatic sealing function essentially results from an application of pressure by the present clamping structure about the full 360° circumference of the tubing joint.

Powell, in U.S. Pat. No. 2,093,210, discloses a clamping member having a flattened end portion which is attached to the clamping member with a rivet. While the Powell clamping member contacts the tubing for a relatively greater percentage of the total tubing circumference than does the Brown structure, the spaced structure of the Powell clamp results in leakage paths due to the provision of a narrow sealing bead which is limited to 270°. The full 360° gas-tight seal indentation provided by the present invention results in a previously unattainable sealing effect for such a simple light-weight and low cost structure.

SUMMARY OF THE INVENTION

The invention provides a clamping structure which is particularly useful for forming a gas-tight 360° indentation in a tubing slip-joint, thereby to seal the joint and to secure the concentric tubing together at or near the joint. The present clamping structure takes the form of a discontinuous circular ring, the discontinuity in the ring being filled by a lug member comprised of a cylindrical tubular housing and a flat web extending from one side of the housing. A first end of the discontinuous ring has a straight threaded bolt leg extending therefrom, the bolt leg being received into and through the cylindrical tubular housing of the lug member. A second end of the ring is welded to the web, the web having an inner arcuate edge portion which extends the circular arc of the ring between said second end and arcuate flared portions of the tubular housing. The arcuate flared portions of the tubular housing complete the circularity of the clamp between the web and that point on the inner circumference at the first end of the ring where the bolt leg extends from said ring. The full circular inner circumference of the present structure as embodied in the ring, the inner arcuate edge portion of the web, and the arcuate flared portions of the tubular housing contacts the outer concentric tubing of the slip-joint and, on tensioning of a nut carried on the threaded distal end of the bolt leg, is reduced to form an indentation in the tubing. The flared portions of the tubular housing indent the tubing in a region of overlap in which arcuate portions of the ring at the first end of said ring also indent the tubing. A gas-tight overlapping region is thus formed, this overlapping region being the critical area at which positive sealing must occur in order to prevent gas leakage. Since the flared portions of the tubular housing are spaced from each other due to the location thereof at the point of entry of the bolt leg into the tubular housing of the lug member, spaced indentations in the tubing are formed by the flared portions, the ring forming a further indentation between those spaced indentations formed by the flared portions. The overlap thereby created acts to form the gas-tight seal provided by the present clamp.

At the point of entry of the bolt leg into the cylindrical tubular housing of the lug member, the inner circumference of the ring is essentially identical to and continuous with the arcuate inner edges of the flared portions, that portion of the ring at said point of entry being positively supported within the tubular housing to prevent radially outward displacement of said ring portion. The circularity of the full 360° inner circumference of the clamping structure is thereby maintained when the structure is tensioned by the single nut carried on the threaded distal end of the bolt leg and the surfaces forming the inner circumference bite into the tubing to indent said tubing.

The bolt leg can extend from the aforesaid first end of the ring at differing angles without departing from the scope of the invention. Similarly, the second end of the ring may extend into the web of the lug member by differing distances, it being only necessary that the inner arcuate edge surfaces of the web be a continuation of the circular inner circumference primarily formed by the ring. This continuous inner circumference applies pressure uniformly against the entire 360° circumference of the tubing joint, the tubing therefore not being able to "escape", that is, extrude, past said inner circumference since no perimetric discontinuity exists into which the tubing material can cold flow.

Accordingly, it is an object of the present invention to provide a clamping structure capable of securing and sealing concentric tubular piping at a slip-joint, the present clamping structure being light in weight, low in cost, easy to install, and of a size which enables the structure to be rotated to clear obstructions encountered particularly in muffler joint and similar applications in motor vehicles.

It is another object of the invention to provide a clamping structure for tubing slip-joints and which is capable of forming a full 360° indentation in concentric tubing comprising the joint, the clamping structure providing a circular continuous inner circumferential surface which is reduced circumferentially by tensioning of a single nut to indent surfaces of the piping.

It is a further object of the invention to provide a ring clamp structure having a main ring member with a discontinuity in the circumference of said ring member, the discontinuity being filled by a lug member welded to one end of the ring member and having a cylindrical tubular housing for receiving a straight threaded bolt leg extending from the other end of the ring member, the structure being tensioned by the torquing of a nut carried on the bolt leg against the lug member, the lug member having arcuate surfaces which form circumferential continuations of the inner circumference of said ring member to form a continuous inner circumferential surface which indents the tubing on tightening of the nut on said leg bolt.

It is a still further object of the invention to provide a lug member for a clamping structure comprised of a discontinuous ring, the lug member having a cylindrical tubular housing into which a straight leg bolt extending from one end of the ring is received, the ring and the cylindrical tubular housing at the locus of entry of the lug bolt into said tubular housing being of substantially identical diameter, the ring being positively supported against outward radial movement at said locus.

Further objects and advantages of the invention will become more readily apparent in light of the following detailed description of the preferred embodiments of the invention.

BRIEF DESCRIPTION OF THE DRAWINGS

FIG. 5 is a side elevational of the clamping structure of FIG. 3;

FIG. 6 is a perspective view of the second embodiment of the present clamping structure fitted about a tubing slip-joint;

FIG. 7 is a plan view of the clamping structure of FIG. 6 with the nut removed from the bolt leg;

FIG. 8 is a side elevational view of the clamping structure of FIG. 6; and

FIG. 9 is an elevational view of the third embodiment of the invention, the lug bolt extending from the ring at an angle differing from that of the embodiments of FIGS. 3 and 6.

DESCRIPTION OF THE PREFERRED EMBODIMENTS

Figure 1:
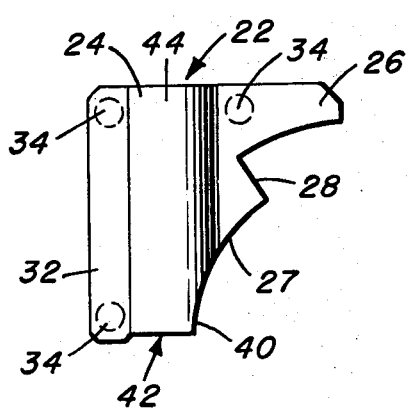
FIG. 1 is an elevational view of the lug member comprising a major structural portion of the invention.
Figure 2:
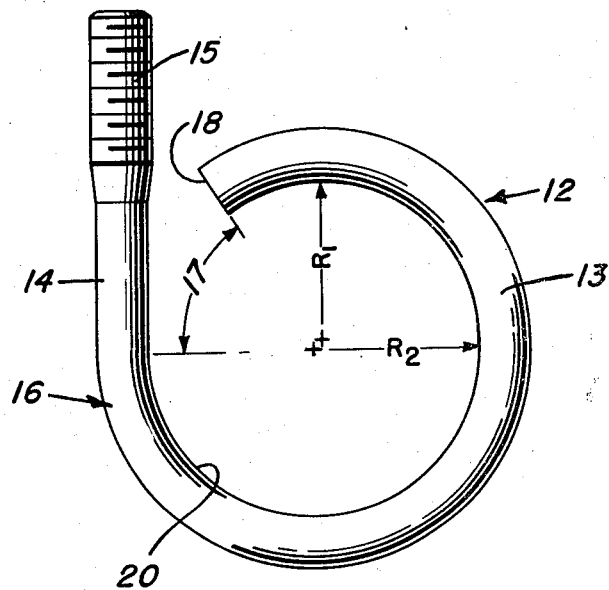
FIG. 2 is an elevational view of the integral ring and bolt leg of the present clamping structure, which ring is assembled to the lug member of FIG. 1.
Figure 3:
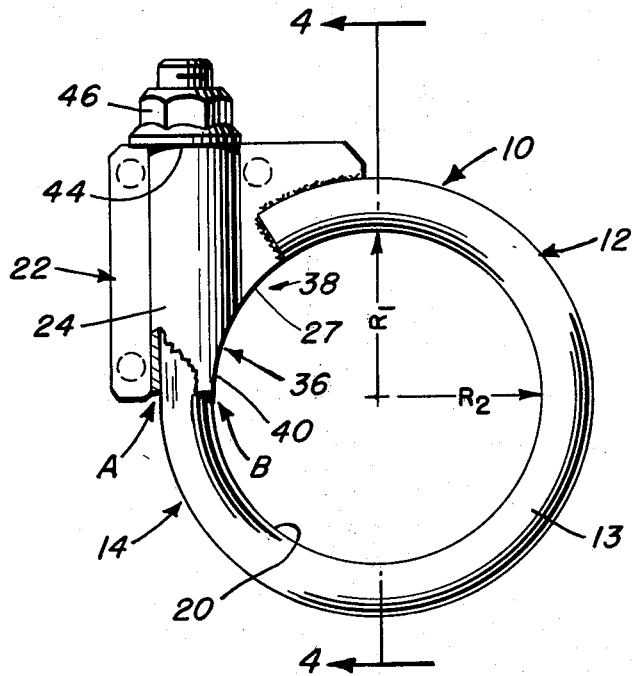
FIG. 3 is an elevational view of the present clamping structure with the lug member and ring of FIGS. 1 and 2 assembled.

Referring now to the drawings and particularly to FIGS. 1–5, a first embodiment of the clamping structure according to the present invention is seen at 10 to comprise a ring 12 and a lug member 22 shown assembled particularly in FIG. 3. In FIG. 1, the lug member 22 is shown to be comprised of a cylindrical tubular housing 24 and a web 26 extending from one side thereof, the web 26 having an arcuate recess 28 formed in a lower portion thereof. The web 26 at and near the juncture thereof with the cylindrical tubular housing 24 is provided with an arcuate inner edge surface 27 which forms a continuous arcuate surface in concert with flared arcuate edge surfaces 40 disposed at entry end 42 of the cylindrical tubular housing 24. It is of importance to note that the arcuate surfaces 27 and 40 form continuations of an arc having a radius of curvature which is identical to the radius of curvature of circular portion 13 of the ring 12 as seen in FIG. 3 shown in the tightened position.

In this first embodiment of the clamping structure 10, the lug member 22 is seen to be formed of two opposing sheet metal plates, each plate having a mating half of the cylindrical tubular housing 24 formed therein, a mating of the two plates fully forming said lug member 22 when projection welds 34 are used to hold said plates together. In this mode of forming the lug member 22, lips 32 extend from that side of the cylindrical tubular housing 24 opposite the web 26, at least two of the projection welds 34 being conveniently provided between said lips 32 for assembly of said lug member 22.

The ring 12 as particularly seen in FIG. 2 comprises the circular postion 13 as aforesaid, the radius of curvature of the circular portion 13 being identical to the radius of curvature of the arc formed by the surfaces 27 and 40 when the clamp is fully tightened as shown in FIG. 3. The circular portion 13 is seen to be discontinuous at 17, a first end 16 of the portion 13 having a straight leg bolt 14 extending outwardly from said portion 13 in a direction parallel to a tangent line taken at the point on the outer periphery of the circular portion 13 at which the straight lug bolt 14 begins to extend from said circular portion 13. As will be seen hereinafter, the lug bolt 14 can also tilt inwardly toward the center of the circular portion 13 without departing from the scope of the invention. The lug bolt 14 is provided with a threaded distal end 15 for receiving a flanged nut 46 as will be described hereinafter. The circular portion 13 of the ring 12 further has a second end 18 spaced from said first end 16 and from the lug bolt 14. The circular portion 13 is further seen to have an inner peripheral surface 20 which comprises a major portion of a circular arc and which surface 20 has a radius of curvature identical to that of the surfaces 27 and 40 as aforesaid.

Figure 4:
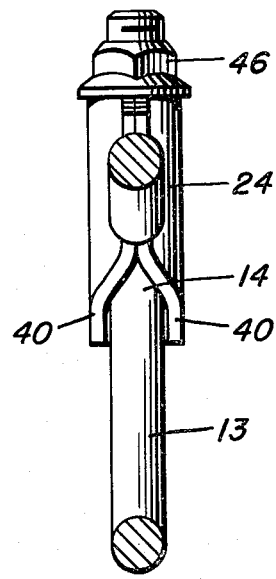
FIG. 4 is a sectional view taken along lines 4—4 of FIG. 3.

As particularly seen in FIGS. 3 and 4, the clamping structure 10 is assembled by extending the leg bolt 14 into the entry end 42 of the lug member 22, at least a portion of the threaded distal end 15 of said leg bolt 14 extending through the cylindrical tubular housing 24 and exteriorly thereof to receive the flanged nut 46. The second end 18 of the ring 12 is received into the arcuate recess 28 in the web 26 and is held therein by a weldment 30. The depth of the recess 28 is caused to essentially be equal to the rod diameter of the circular portion 13 such that on welding, the inner peripheral surface 20 of said ring 12 is flush with the arcuate inner edge surface 27 of the web 26, thereby to form a continuation of the arc of the surface 20. The spacing at 38 between the second end 18 of the ring 12 and the cylindrical tubular housing 24 can be varied as desired.

As can particularly be seen in FIG. 3, the second end 18 of the circular portion 13 is seen to be disposed substantially at the entry end 42 of the cylindrical tubular housing 24, the rod diameter of the circular portion 13, that is, the axial width or thickness of the body of the ring 12, is seen to be equal to the distance between points A and B, point A being located on the outermost interior wall of the channel formed within said housing 24 and point B being the termination point of the flared arcuate edge surfaces 40. In this manner, the ring 12 is supported at critical sealing area 36 against radially outward displacement when the clamping structure is tensioned by tightening of the flanged nut 46. The flared arcuate surfaces 40 accordingly maintain a continuous arcuate surface in concert with that portion of the inner peripheral surface 20 of the ring 12 at the entry end 42 of the housing 24. A continuous circular surface is thereby provided by the inner peripheral surface 20 of the ring 12, by the arcuate inner edge surface 27 of the web 26, and by the flared arcuate edge surfaces 40 formed at the entry end 42 of the cylindrical tubular housing 24. When the flanged nut 46 is tensioned against seating end 44 at the upper portion of the cylindrical tubular housing 24, the circumferential surface formed by the surfaces 20, 27, and 40 is caused to be reduced, thereby compressing an entity such as a piece of pipe disposed within the interior of the ring 12. An indentation or bead is thus formed in the external surface of such piping, the clamping structure 10 therefore being particularly useful to seal concentric piping members at or near a slip-joint, such joints being well known in the art.

As can particularly be seen in FIG. 4, the flared arcuate edge surfaces 40 are spaced apart by virtue of having been formed from spaced walls of the cylindrical tubular housing 24. These flared arcuate edge surfaces 40 contact piping held within the ring 12 and "bite" into such piping in an overlapping relation with that portion of the ring 12 which extends into said housing 24 at the entry end 42 thereof. Therefore, each of the spaced surfaces 40 applies pressure on a piece of piping on respective sides of the ring 12 and acts simultaneously against such piping to provide effective sealing at the critical sealing area 36. In this manner, an essentially gas-tight seal is provided on indentation of such piping.

Referring now to FIGS. 6-8, a second embodiment of the present invention is seen to differ from the clamping structure 10 primarily by the formation of the lug member 22 from a single flat piece of sheet metal. As particularly seen in FIG. 7, lug member 50 is formed of a single, folded stamping which requires welding only in the ring to web joint area for holding web 52 together, a cylindrical tubular housing 54 being thus formed on folding of the stamping comprising said lug member 50. The lug member 50 is seen to be absent the lips 32 of the lug member 22 and does not require projection welds such as those welds 34 for assembly.

As can particularly be seen in FIG. 6, the present clamping structure can be utilized in all of the embodiments thereof to form a slip-joint by slipping said structure over the end of female tubing 56, male tubing 58 being then slipped into the female tubing 56 in a known manner. The clamping structure of the invention can then be rotated into any desired position, all of the previous operations being accomplished readily with only one hand. Since the flange nut 46 is preferably initially threaded on end 15 of the lug bolt 14, said nut 46 can be readily tightened within the clamp confines of a typical installation to a desired torque level. An indentation in the tubing 56 and 58 is thereby formed to provide a gas-tight 360° locking indentation. As can be appreciated, as the nut 46 is torqued, the diameter and thus the inner circumference of the ring 12 is reduced to form the aforesaid indentation in the tubing. In an aluminized steel tubing joint of either 2 inch or 2¼ inch size, the walls of said tubing being 0.060 inches, it is possible to obtain a virtually 0-leakage seal at 20 ft/lbs. nut torque at a test pressure of 15 psi. Original equipment clamps heretofore provided at analogous muffler inlet and outlet connections in modern vehicles cannot provide such sealing function, there typically being leakage in excess of 18,000 SCCM at such joints. The present clamping structure is also seen to occupy a minimum of space within the use environment and is seen to be exceptionally light weight and low in cost.

Referring now to FIG. 9, a further embodiment of the invention is seen to have cylindrical housing 60 of lug member 62 tilted inwardly toward the center of the clamping structure relative to the disposition of the housing 24 shown in FIGS. 1-5. Lug bolt 64 of the structure is tilted similarly "to the right", that is, toward the center of the ring portion of the structure, this tilting providing an increase in the ability of the structure to wrap around tubing being sealed by the present clamping structure.

Referring now to FIG. 2, it is to be seen that the radius $R_1$ of the portion of the ring 13 which is welded to the lug member 22 has a different center from the radius $R_2$ of the remaining portions of the ring 13 when the structure is in the relaxed, non-tightened conformation. Radius $R_2$ is also caused to be slightly greater in length than radius $R_1$. When the structure is tightened as seen in FIG. 3, the radii of all portions of the ring 13 have a common center and are equal in length.

It is therefore to be understood that the clamping structure according to the present invention can be configured other than as explicitly illustrated in the drawings and described in the foregoing specification, the scope of the present invention being defined by the appended claims.

What is claimed:

1. A pipe or tube clamp comprising: a substantially rigid discontinuous arcuate ring member formed from circular stock and having a substantially straight leg portion extending from a first end thereof; a lug member disposed between said first end of the ring member and a second end thereof, said second end being fixedly joined to said lug member, the inner circumferential surface of the ring member forming a continuous circular arc with an arcuate surface formed in the lug member, the arcuate surface of the lug member defining a continuous arc extending between the ends of the ring member and forming an uninterrupted continuation of the arc defined by the ring member, the lug member further comprising a housing which receives the leg portion of the ring member therethrough, and including a web extending from one side of the housing, the web being joined to the second end of the ring member and having an arcuate inwardly disposed edge surface which forms at least a portion of the arcuate surface formed in the lug member, the housing having spaced flared arcuate edge surfaces at the end thereof at which the ring member extends into the housing, said surfaces forming at least an additional portion of the arcuate surface formed in the lug member; and means disposed on the distal end of the leg portion for tensioning the ring member to reduce the diameter of the clamp.

2. The clamp of claim 1 and further comprising means for supporting the ring member at the entry thereof into the housing against radially outwardly displacement, thereby to maintain a continuous arcuate inner circumferential surface.

3. The clamp of claim 1 wherein the radial depth of the housing at the entry of the ring member therein is equal to the rod diameter of the ring member.

4. The clamp of claim 1 wherein the tensioning means comprise a nut and a threaded portion formed on the distal end of the leg portion for receiving the nut, the nut being torqued against the lug member.

5. The clamp of claim 1 wherein the straight leg portion extends from the ring member in a direction parallel to a line tangent to the outer circumference of the ring member at that point at which the leg portion extends from the ring member and enters the housing.

6. The clamp of claim 1 wherein the straight leg portion extends from the ring member at an angle to a line tangent to the outer circumference of the ring member at that point at which the leg portion extends from the ring member.

7. The clamp of claim 1 wherein the portion of the ring member at the second end thereof overlaps the web over a major portion of the arcuate inwardly disposed edge surface of the web.

8. The clamp of claim 1 wherein the portion of the ring member which is joined to the lug member has a radius of curvature in the untightened conformation which has a different center from remaining portions of the ring member, all arcuate portions of the ring member having the same center and having equal radii when the clamp is tightened.

* * * * *